(12) United States Patent
Webb et al.

(10) Patent No.: US 10,110,768 B2
(45) Date of Patent: Oct. 23, 2018

(54) SYSTEM AND METHOD FOR REMOTE DEVICE INTERFACE CUSTOMIZATION

(71) Applicant: Toshiba TEC Kabushiki Kaisha, Higashigotanda, Shinagawa-ku (JP)

(72) Inventors: David Webb, Ladera Ranch, CA (US); William Su, Riverside, CA (US); Dehua Zhao, Irvine, CA (US); Marianne Kodimer, Huntington Beach, CA (US); Louis Ormond, Irvine, CA (US); Christopher Nguyen, Huntington Beach, CA (US)

(73) Assignee: Toshiba TEC Kabushiki Kaisha, Higashigotanda (JP)

( * ) Notice: Subject to any disclaimer, the term of this patent is extended or adjusted under 35 U.S.C. 154(b) by 0 days.

(21) Appl. No.: 15/966,955

(22) Filed: Apr. 30, 2018

(65) Prior Publication Data
US 2018/0249022 A1 Aug. 30, 2018

Related U.S. Application Data

(63) Continuation-in-part of application No. 15/862,886, filed on Jan. 5, 2018, which is a continuation of
(Continued)

(51) Int. Cl.
*H04N 1/00* (2006.01)
*H04N 1/32* (2006.01)

(52) U.S. Cl.
CPC ....... *H04N 1/0097* (2013.01); *H04N 1/00411* (2013.01); *H04N 1/00424* (2013.01);
(Continued)

(58) Field of Classification Search
CPC ............ H04N 1/0097; H04N 1/00411; H04N 1/00424; H04N 1/00506; H04N 1/00511;
(Continued)

(56) References Cited

U.S. PATENT DOCUMENTS

| 2012/0069131 | A1* | 3/2012 | Abelow | G06Q 10/067 |
| | | | | 348/14.01 |
| 2013/0073388 | A1* | 3/2013 | Heath | G06Q 30/02 |
| | | | | 705/14.53 |
| 2017/0310831 | A1* | 10/2017 | Kodimer | H04N 1/00344 |

* cited by examiner

*Primary Examiner* — Allen H Nguyen
(74) *Attorney, Agent, or Firm* — Ulmer & Berne LLP

(57) ABSTRACT

A system and method for selecting and registering applications associated with operation of a multifunction peripheral includes a processor, a network interface and a memory. A plurality of user selectable applications for operation of a multifunction peripheral controller is stored. Each customization group includes a plurality of electronic files, and each customization group corresponds to a unique business type. A plurality of device customization data sets, each data set corresponding to document processing in the multifunction peripheral are also stored. Indicia are displayed identifying customization groups by business type. At least one user selected application is identified. A customizations menu listing available customizations from the selected identified customization group is generated. A user selects one or more applications from the customizations menu. A determination is made as to whether each application associated with the user application selection input is registered. Each unregistered application is registered.

20 Claims, 17 Drawing Sheets

Related U.S. Application Data application No. 15/455,348, filed on Mar. 10, 2017, now Pat. No. 9,912,826, application No. 15/966,955, filed on Apr. 30, 2018, which is a continuation-in-part of application No. 15/455,785, filed on Mar. 10, 2017, and a continuation-in-part of application No. 15/680,720, filed on Aug. 18, 2017, and a continuation-in-part of application No. 15/455,348, filed on Mar. 10, 2017, now Pat. No. 9,912,826, and a continuation-in-part of application No. 15/455,785, filed on Mar. 10, 2017.

(60) Provisional application No. 62/491,553, filed on Apr. 28, 2017, provisional application No. 62/334,634, filed on May 11, 2016, provisional application No. 62/360,581, filed on Jul. 11, 2016.

(52) U.S. Cl.
CPC ..... *H04N 1/00506* (2013.01); *H04N 1/00511* (2013.01); *H04N 1/32122* (2013.01); *H04N 2201/0094* (2013.01); *H04N 2201/3211* (2013.01)

(58) Field of Classification Search
CPC ....... H04N 1/32122; H04N 2201/3211; H04N 2201/0094
USPC ....................................................... 358/1.15
See application file for complete search history.

| | Application Name | Version | Manual Operation | Start Type | Uninstall |
|---|---|---|---|---|---|
| | Elevate iD Copy | 1.0.0 | | | Uninstall |
| | Elevate Copy | 1.0.0 | | | Uninstall |
| | Meter Collection | 1.6.2 | Start Stop | Auto Manual | Uninstall |
| | e-BRIDGE Plus for box | 1.1.3 | | | Uninstall |
| | e-BRIDGE Plus for Dropbox | 1.1.2 | | | Uninstall |
| | e-BRIDGE Plus for Google Drive ™ | 1.1.2 | | | Uninstall |
| | e-BRIDGE Plus for One Drive ® | 1.1.2 | | | Uninstall |
| | e-BRIDGE Plus for USB Storage | 1.0.2 | | | Uninstall |
| | Elevate Scan to Folder | 1.0.0 | | | Uninstall |
| | Elevate Scan to E-mail | 1.0.0 | Start Stop | Auto Manual | Uninstall |
| | Elevate | 1.0.6 | | | Uninstall |

FIG. 16

SYSTEM AND METHOD FOR REMOTE DEVICE INTERFACE CUSTOMIZATION

RELATED APPLICATION DATA

This application claims the benefit of U.S. Patent Application Ser. No. 62/491,553 filed Apr. 28, 2017, which is incorporated by reference in its entirety. This application is also a continuation-in-part of U.S. application Ser. No. 15/862,886, filed Jan. 5, 2018, which is a continuation of U.S. application Ser. No. 15/455,348, filed Mar. 10, 2017 (now U.S. Pat. No. 9,912,826), which claims the benefit of U.S. Provisional Application No. 62/334,634, filed May 11, 2016, all of which are incorporated herein by reference. This application is also a continuation-in-part of U.S. application Ser. No. 15/455,785, filed Mar. 10, 2017, which claims the benefit of U.S. Provisional Application No. 62/360,581, filed Jul. 11, 2016, both of which are incorporated herein by reference. This application is also a continuation-in-part of U.S. application Ser. No. 15/680,720 filed Aug. 18, 2017, which claims the benefit of U.S. Patent Application Ser. No. 62/491,553, filed Apr. 28, 2017, and also claims the benefit of U.S. Provisional Application No. 62/360,581, filed Jul. 11, 2016, and also claims the benefit of U.S. Provisional Application No. 62/334,634, filed May 11, 2016, and is also a continuation-in-part of U.S. application Ser. No. 15/455,348, filed Mar. 10, 2017, and is also a continuation-in-part of U.S. application Ser. No. 15/455,785, filed Mar. 10, 2017, all of which are incorporated herein by reference.

TECHNICAL FIELD

This application relates generally to configuring device functionality. This application is more particularly directed to installation and management of applications for installation on multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Earlier on, MFPs were operated by users via electromechanical switches, such as pressing a dedicated "copy" button, or by dialing a fax number and hitting a "send" switch when a connection was made to a remote facsimile machine. MFPs have become substantially more powerful, and, correspondingly, more complex for users to operate. MFP devices now typically employ a touchscreen user interface. Various functions and controls can be displayed and selected by a screen having touch-selectable areas.

SUMMARY

In accordance with an example embodiment of the subject application, a system and method for selecting and registering applications associated with operation of a multifunction peripheral includes a processor, a network interface and a memory. The memory stores a plurality of user selectable applications for a multifunction peripheral controller associated with user modification of control of multifunction peripheral operations. The memory further stores a plurality of identified electronic customization groups, each customization group including a plurality of electronic files, wherein each customization group corresponds to a unique business type. The memory further stores a plurality of device customization data sets, each data set corresponding to document processing in the multifunction peripheral. Display indicia identify customization groups by business type. At least a selected one of the user selectable applications associated with received user selection data is identified. A customizations menu listing available customizations from the selected identified customization group is generated. A user application selection input is received responsive to user selection corresponding to a generated customization menu. A determination is made as to whether each application associated with the user application selection input is registered. Each unregistered application is registered.

BRIEF DESCRIPTION OF THE DRAWINGS

Various embodiments will become better understood with regard to the following description, appended claims and accompanying drawings wherein:

FIG. 16 is a first screenshot of an example application for managing customized user interfaces of a multifunction peripheral.

DETAILED DESCRIPTION

Figure 1:
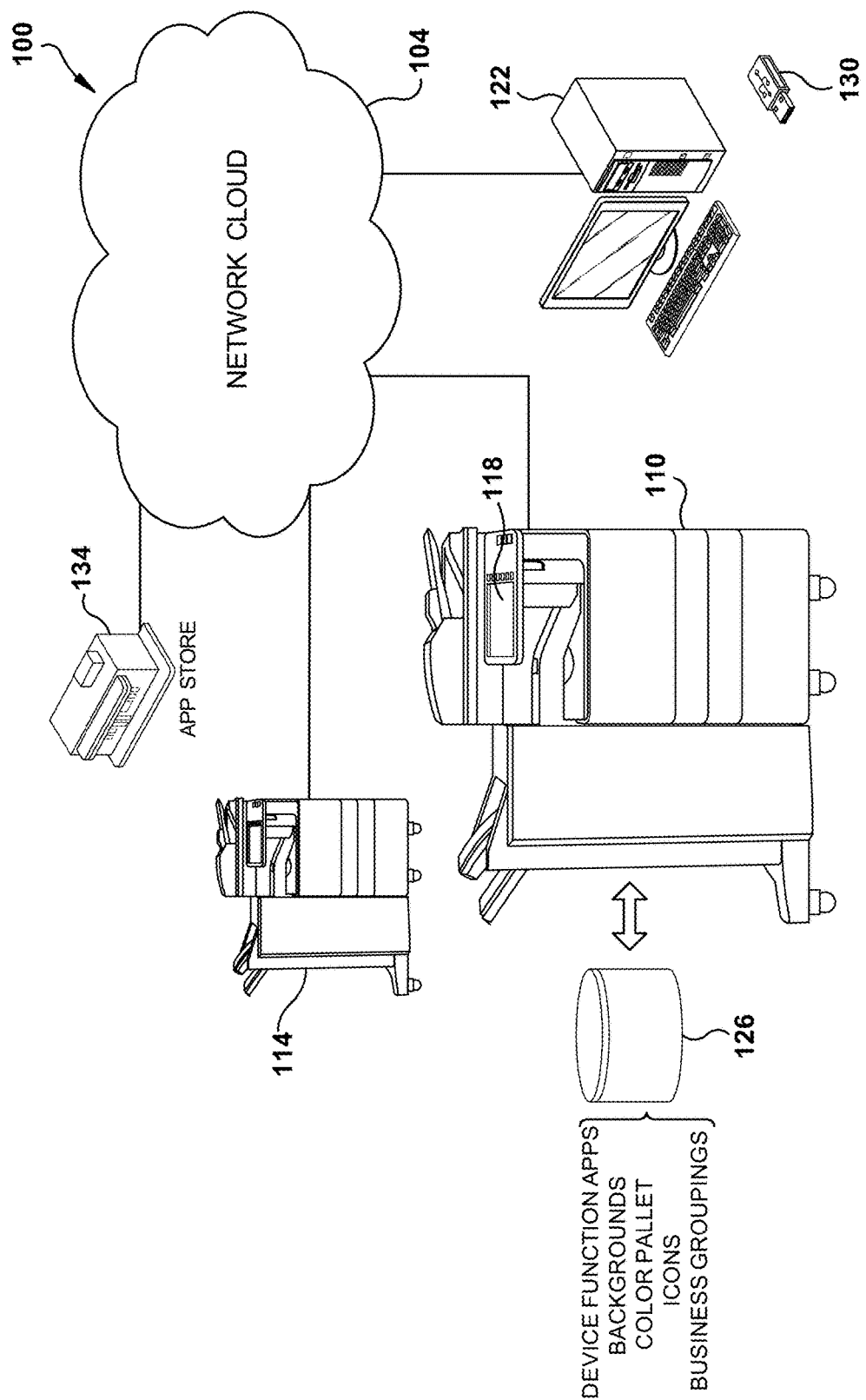
FIG. 1 an example embodiment of system for installation and management of applications used in a customizable multifunction peripheral.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFP touchscreen user interfaces provide access to a large array of device functions, such as faxing, scanning, printing or e-mailing of documents. Additional selections may be added for functions such as paper size selection, collation, hole punching, stapling, duplex printing or N-up printing of multiple pages on a single sheet. A touchscreen may be used for logging in users, such as with a user ID and password. Touchscreens may also be used for charging job costs to an identified charge account.

It is often desirable for end users to customize their MFP device user interface. For example, a company may wish to eliminate options entirely for color printing to save on printing cost. A company may have a specific need for certain or specialized job functions that might require a user to navigate a complex set of menus each time such a function is to be used. Changing software code for customized interfaces is a complex procedure and therefore generally reserved to the MFP manufacturer. Larger companies may have the resources to hire a device manufacturer to generate a specific user interface for use with a large number of its devices. However, this is cost prohibitive to most end users.

One solution to providing a user customizable interface includes generating a customization interface for users to use. Such capability requires a customization interface that is user-friendly and includes a mechanism for customization that will be fully compatible with their device and readily savable for automatic loading. Such a system is taught by U.S. Patent Application Ser. No. 62/491,553, the disclosure of which is incorporated herein by reference.

By way of example, an MFP suitably arrives to a business pre-populated with settings, menus, or electronic documents specific to different businesses. For example, there may be a default administrator setup choice for "Legal Profession," which includes legal forms, legal documents, brief templates and blank time slips. It may also include address information for various courts or governmental agencies. Thus, all or some of the law firm's needs may be setup immediately. The administrator may then add or replace electronic documents, such as by uploading or scanning from paper. They may also add needed device functions not appearing in the standard legal setup. They may also add or modify menu structures, as well as customize colors, fonts, resolution, etc. They may also import their firm logo so that it appears on the user interface. This is suitably done via a portable data device, such as USB drive, CD or DVD, via a network connection or by scanning a paper document bearing the logo. The administrator may also export and replicate this interface on other MFP devices in use by the business.

In accordance with the subject application, FIG. 1 illustrates an example embodiment of an MFP network 100 that includes one or more MFPs, illustrated by MFPs 110 and 114. Network 104 is suitably comprised of a local area network (LAN) or a wide area network (WAN) which may comprise the global Internet, or any suitable combination thereof. A system administrator or other user can access MFP control via any suitable user interface, such as an integrated user interface 118 or remotely, such as via workstation 122. While workstation 122 is illustrated as a wired computer, it will be appreciated that any suitable data device, including smartphones, tables, notebook computers, or the like, with network connections that are wireless or wired, may be used. Remote device interfacing is suitably done by accessing an MFP via a network address, such as an internet protocol or IP address. Access may be directly through a web interface, and may include tools such as TOPACCESS from Toshiba America Business Solutions, Inc.

MFP 110 is provided with data storage 126 for electronically storing data corresponding to available device function applications, display backgrounds, color pallets, icons, business groupings, etc.

Additional applications that are available to control MFPs may also be added. They may be physically transported to the MFP via a portable data device such as flash drive 130 or any other suitable data transfer mechanism including BLUETOOTH, near field communication (NFC), optical, CD, DVD, wireless or wired network, etc. Applications may also be purchased from an application store, such as App Store 134, suitably via network cloud 104.

Additional applications that are available to control MFPs may also be added. They may be physically transported to the MFP via a portable data device such as flash drive 130 or any other suitable data transfer mechanism including BLUETOOTH, near field communication (NFC), optical, CD, DVD, wireless or wired network, etc. Applications may also be purchased from an application store, such as App Store 134, suitably via network cloud 104.

Device user interface customization can be accomplished via software running on an intelligent controller of an MFP. User interaction for customization can be accomplished by use of the MFPs integrated touchscreen. Device function customization is suitably accomplished by selection from a menu of callable applications, such as embedded web applications. While this is very useful, it using an MFP touchscreen for customization doesn't allow a user an opportunity to visualize how the custom interface will appear once loaded, particularly as the interface is being setup. Also, a user interface is advantageously updated and customized according to in-house corporate requirements, corporate look-and-feel, and contract of professional services. User interface customization can be completed with a customization file or a series of user interface controls to be configured. With this approach, the user cannot visualize the end result and editing and customization yields unpredictable results. Additionally, it may be inconvenient for an administrator to physically approach one or more MFPs to generate a customized menu.

Figure 2:
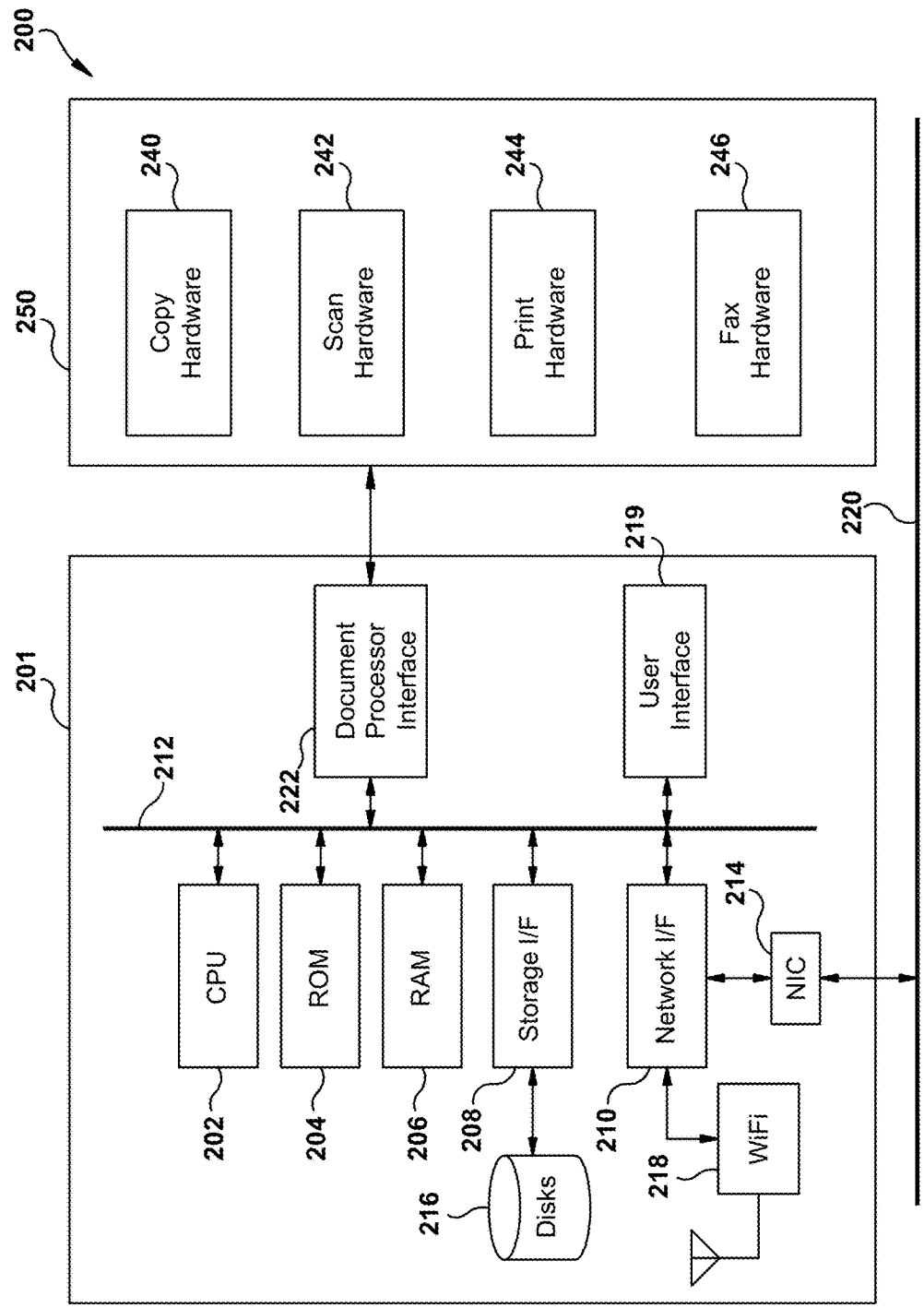
FIG. 2 is an example embodiment of a document rendering system.

Turning now to FIG. 2, illustrated is an example embodiment of a document rendering system 200 suitably comprised within an MFP, such as with MFP 110 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightening, telephone line, or the like. Processor 202 is also in data communication with one or more sensors 219 which provide data relative to a state of the device or associated surroundings, such as device temperature, ambient temperature, humidity, device movement and the like.

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
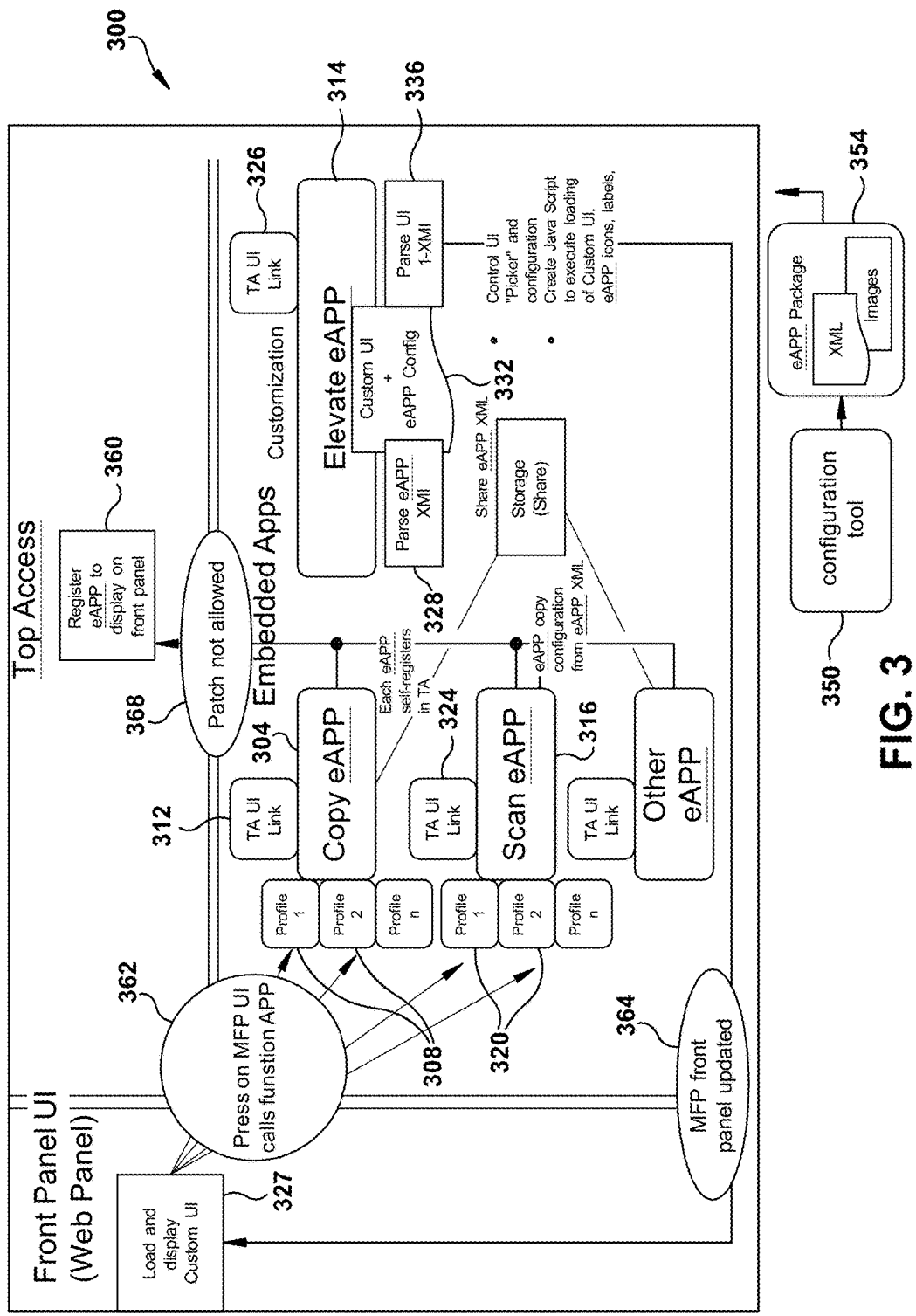
FIG. 3 is an example embodiment of a webserver for a user interface customization tool.

FIG. 3 illustrates an example embodiment of a webserver for an MFP user interface customization tool 300 usable via web client access via a platform such as TOPACCESS. Customization options are selectable from embedded electronic applications (eAPPs). Embedded applications in the illustrated example include a copy eAPP 304 functional to control a device copy function with one or more selectable profiles 308. TOPACCESS user interface link 312 provides for device interaction. Similarly, scan eAPP 316 includes selectable profiles 320 and a TOPACCESS user interface link 324. As a user interface is built, the user can see the results via a rendering of how the configuration would look at 327.

In the example embodiment of FIG. 3, customization is accomplished by another callable eAPP, customization eAPP 314. Customization eAPP 314 include an extensible markup language (XML) eAPP parser 328, a custom user interface and eAPP configurator 332, and an XML user interface parser 336. User interaction via a web interface is accomplished via configuration tool 350 which calls customization eAPP 314 with an eAPP package 354 providing interaction with XML and image files, such as GIF, TIFF, JPEG or any other suitable image file format. Such image files allow for user placement of images such as company logo's, on a user interface. Customization can also include selection of color schemes, menu layout, background images, available device functions and ordering of nested interface screens. Once a user interface is completed, it is registered and displayed at 360. Installation of eAPPS is suitably done via network connection with a manufacturer request 362, which patches may be deemed acceptable or unacceptable for use in eAPPS at 364 or a display at 368. In accordance with the forgoing, a platform is provided for a web based user interface to customize an MFP copier look-and-feel by selecting a template layout, adding resident applications to be placed within the template layout, customization of those applications, and customization of the look and feel using a user interface that provides a realistic preview and in-place editing thereby promoting usability and predictability of results.

Figure 4:
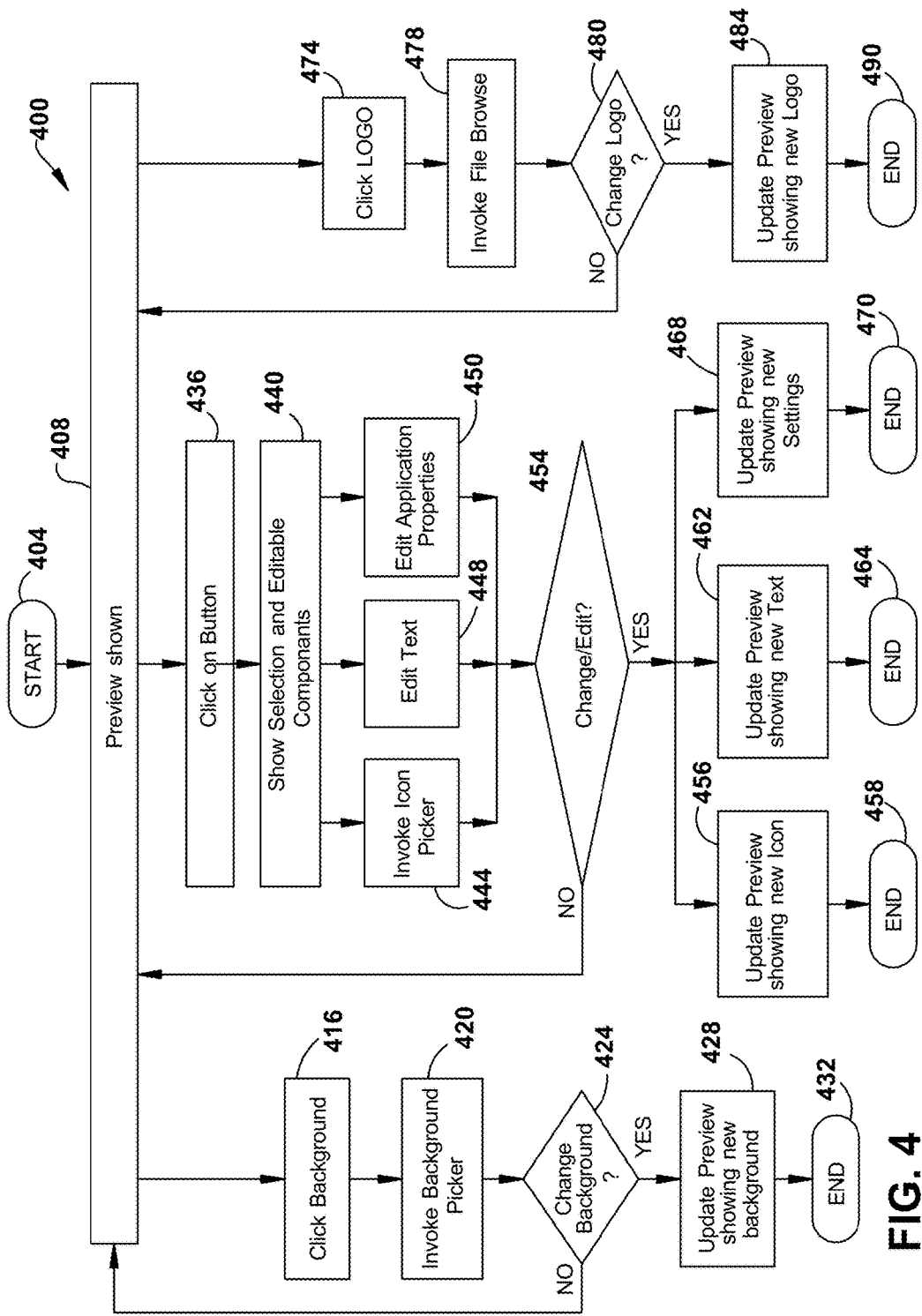
FIG. 4 is a flowchart of an example embodiment of a user interface customization system.

Referring now to FIG. 4, illustrated is a flowchart 400 of an example embodiment of a user interface customization system. Operation commences at 404. A preview screen, suitably initially a default user interface or previously customized user interface is displayed at 408. A user can select to alter a background, suitably by engaging a mouse click on the preview background at block 416. Once selected, the use selects from background options at block 420. If a selection is made as determined at block 424, the background is changed and a preview is generated at block 428. The system suitably returns to preview screen 408, now updated, if more customization is to be done. If not, the process terminates at block 432.

If a user clicks on a button on the preview interface at block 436, they are provided with a selection screen of elements, some of which may be editable as shown in block 440. An icon or other graphical element is selected and invoiced at block 444, and text may be edited at block 448. Properties of an associated application or applications may be edited at block 450. If changes are made and accepted at block 454, then updated views of icons are made at block 456, and the process terminates at block 458 unless additional interface customization is to be made. If so, the process suitably returns to block 408. Similar progress is made for text preview at block 462, optionally terminating if complete at block 464 or returning to block 408 if more customization is desired. Changed settings are suitably previewed at block 468, and the process ends at block 470 or returns to block 408. If changes are not made or accepted, processing returns to block 408.

If a user clicks on a logo, or logo area on the preview interface image at block 474, they are prompted to direct the system to a location of a desired electronic image file at 478 for selection. Once selected at block 480, the preview image is updated at block 484 and the process terminates at block 490. If additional customization is to be made, the process returns to block 408.

Figure 5:
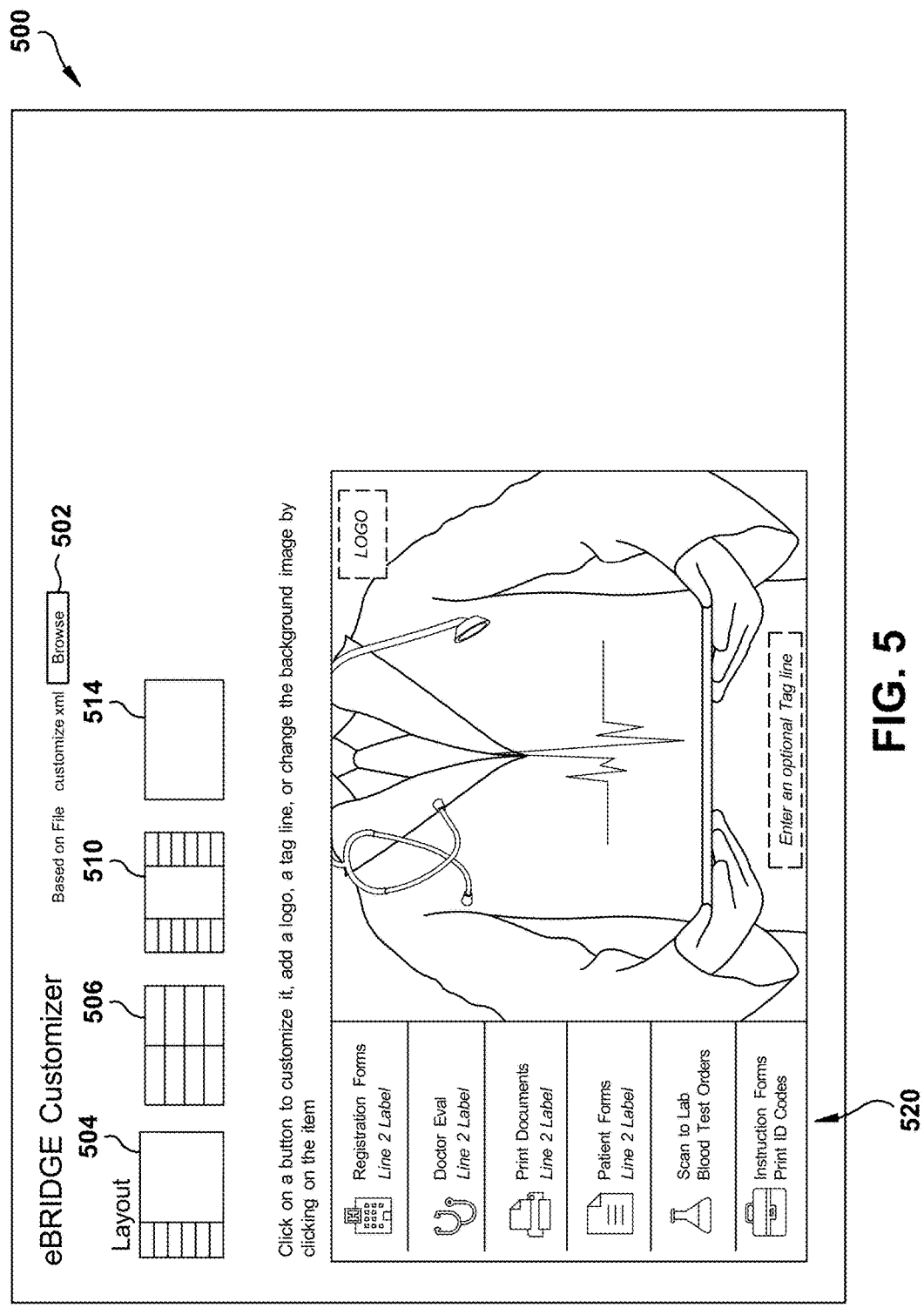
FIG. 5 is an example embodiment of a first interactive preview screen for user interface customization.

FIGS. 5-10 illustrate example embodiments of interactive preview screens for user interface customization. In FIG. 5, web page 500 is generated on a web interface, such as on administrative terminal 150 of FIG. 1. User selects to browse layouts at 502, and layout options 504, 506, 510 and 514 are displayed. For example, the user can select layout 504 and place selectable button areas in a left justified fashion as illustrated at 520.

Figure 6:
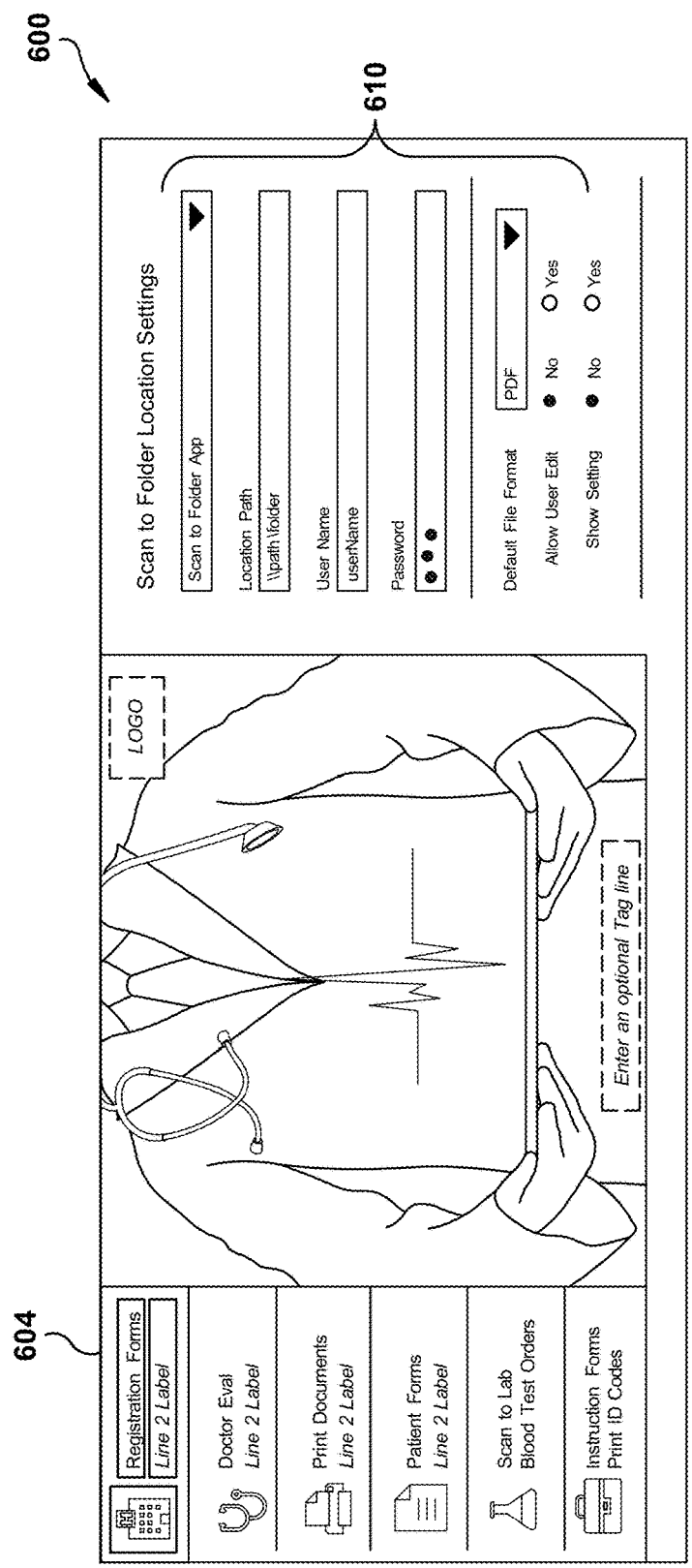
FIG. 6 is an example embodiment of a second interactive preview screen for user interface customization.

FIG. 6 illustrates an example embodiment of a customization screen 600 wherein the user chooses button 604 to load their own customized forms. The user inputs appropriate information at 610 and one or more custom forms are made available through the customized user interface.

Figure 7:
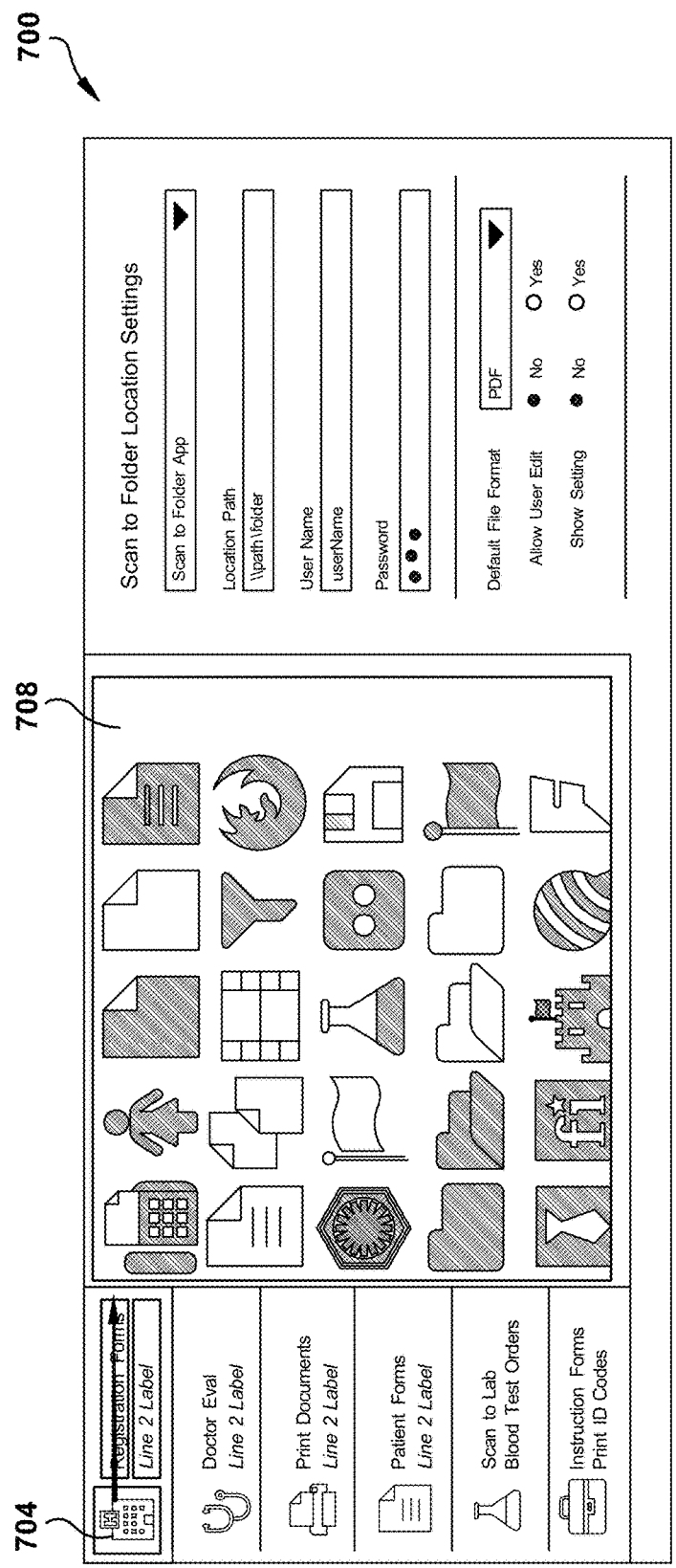
FIG. 7 is an example embodiment of a third interactive preview screen for user interface customization.

FIG. 7 illustrates an example embodiment of a customization screen 700 where the user selects the icon area 704 to select an icon for a button area. A listing of available icons for selection with that control is displayed on screen area 708.

Figure 8:
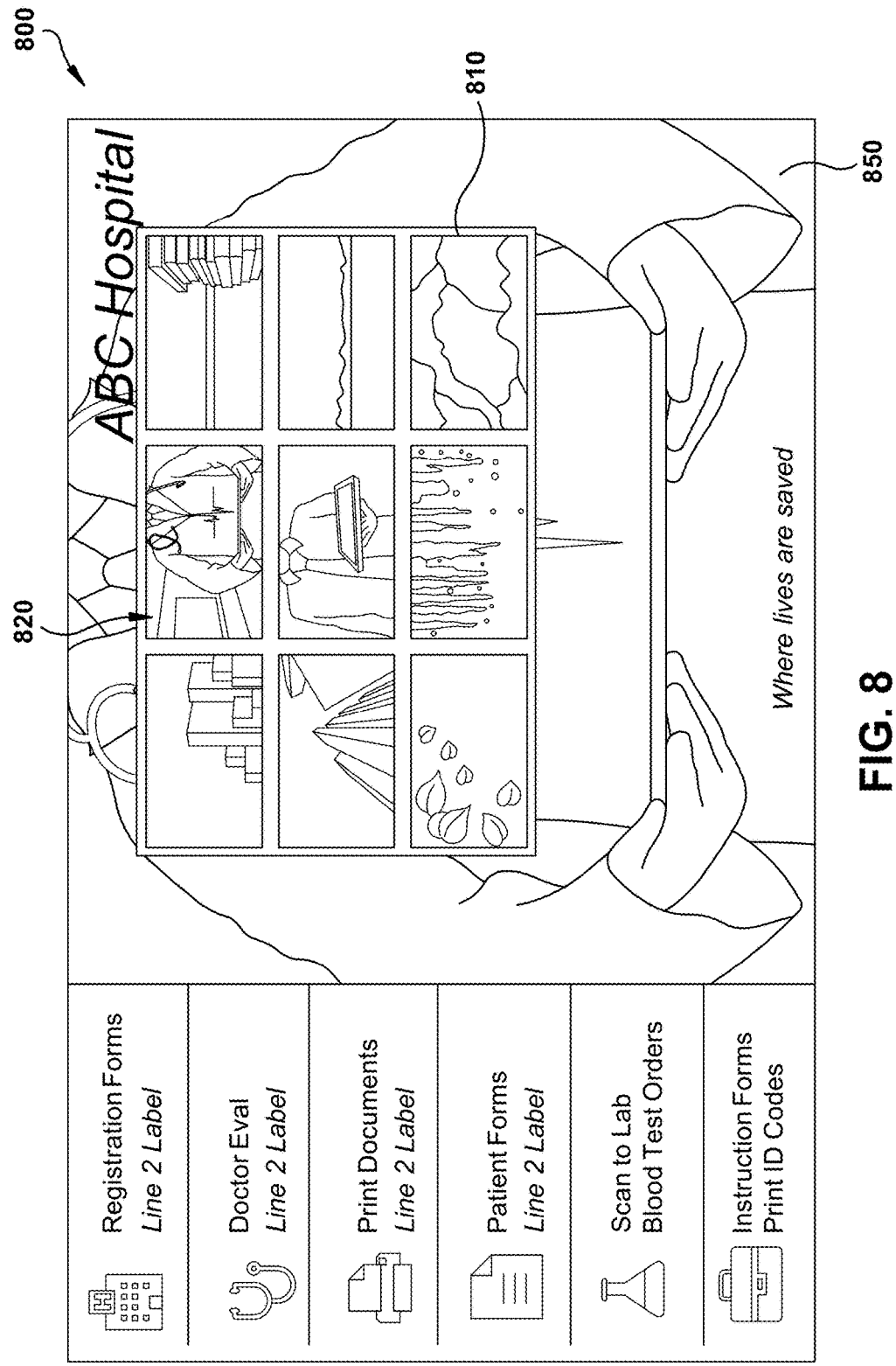
FIG. 8 is an example embodiment of a fourth interactive preview screen for user interface customization.

FIG. 8 illustrates an example embodiment of a preview user interface screen 800 wherein a listing of possible backgrounds is presented at screen area 810. When a selection is made to background 820, it appears on the preview as background area 850.

Figure 9:
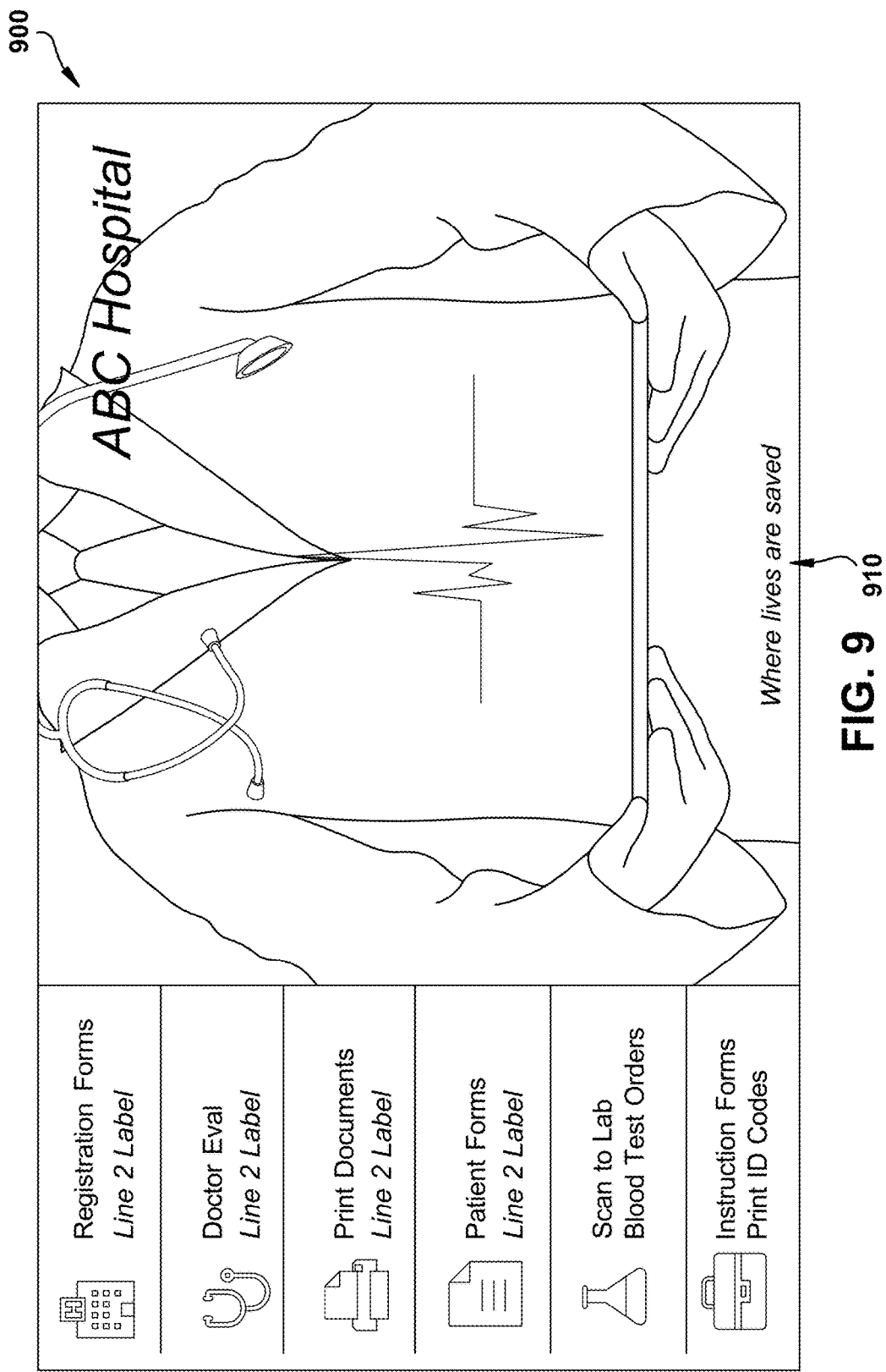
FIG. 9 is an example embodiment of a fifth interactive preview screen for user interface customization.

FIG. 9 illustrates an example embodiment of a preview user interface screen 900 wherein a user clicks on a tagline area 910 to select the tagline "Where lives are saved" for editing.

Figure 10:
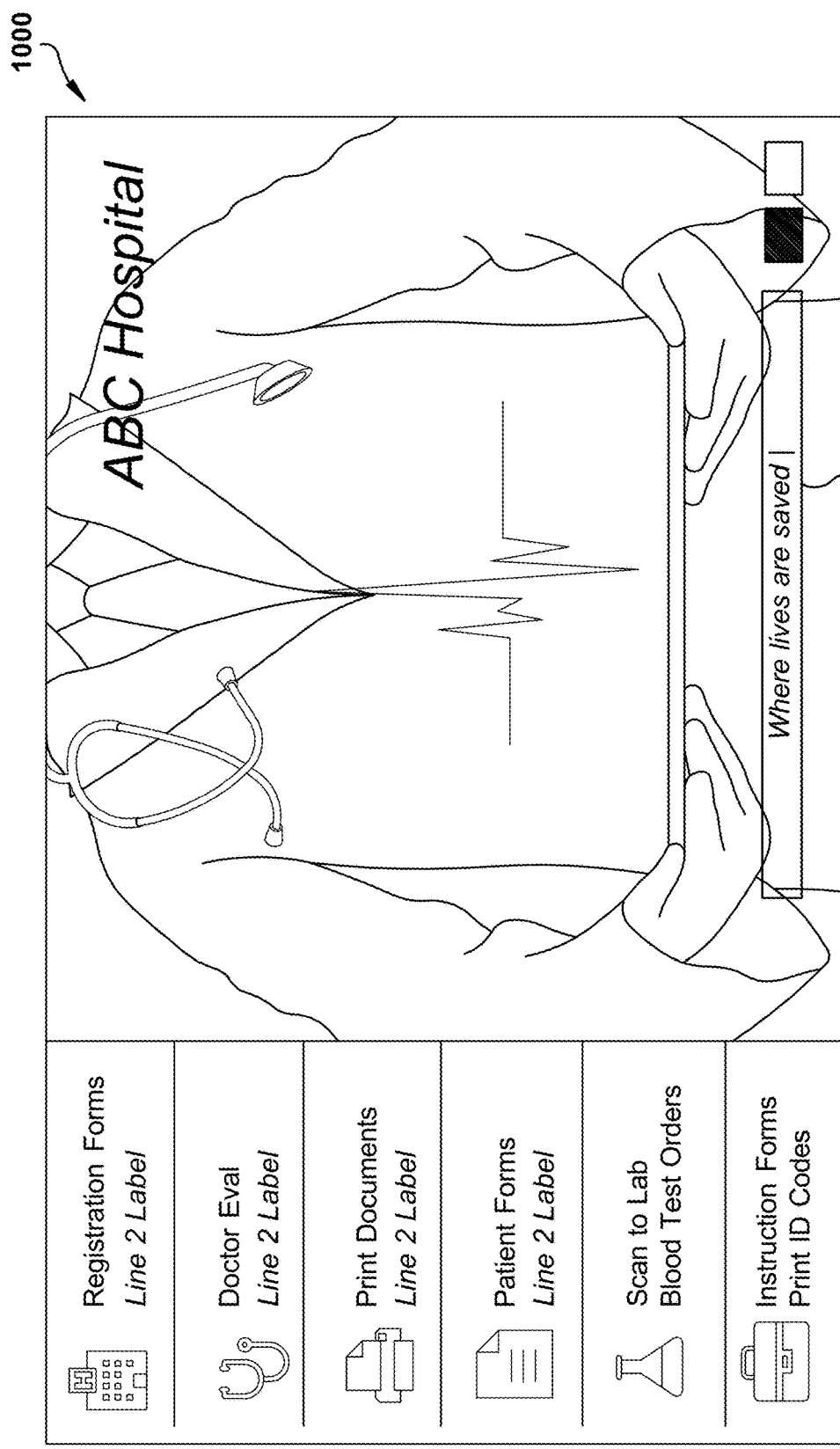
FIG. 10 is an example embodiment of a sixth interactive preview screen for user interface customization.

FIG. 10 illustrates an example embodiment of a preview user interface screen 1000. Selection of the tagline area 910 in FIG. 9 provides a text entry box 1010 in FIG. 10 wherein a modification can be made and stored. In accordance with the forgoing, an intuitive user interface customization tool allows for interface customization, suitably remotely, while a user can see in real time how an interface will look once applied to an MFP.

Figure 11:
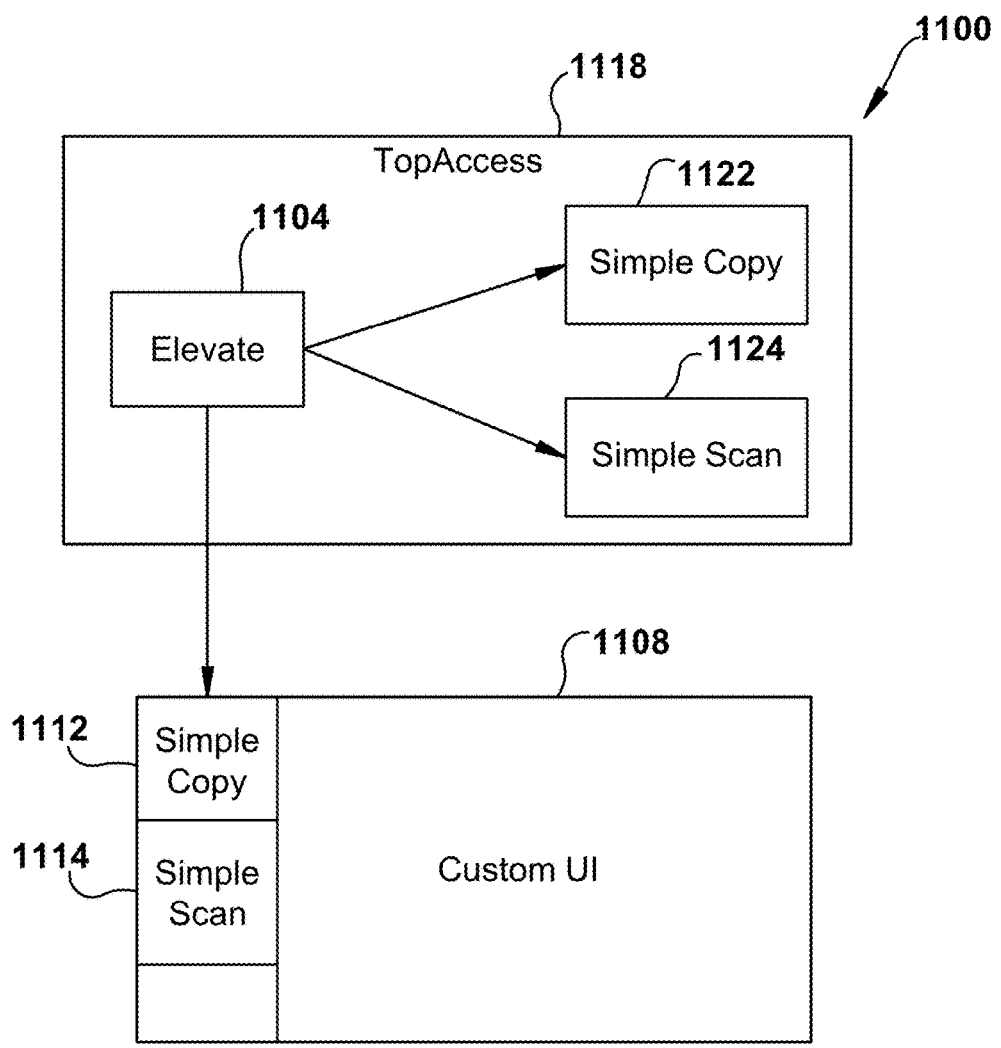
FIG. 11 is a system overview diagram of an example embodiment of an application for customizing the front panel of a multifunction peripheral.

With reference to FIG. 11, a system overview diagram 1100 of an embodiment of an Elevate eApp 1104 is illustrated. The Elevate eApp 1104, or any other suitable application, facilitates deployment of a custom user interface 1108 comprising example embedded eApps Simple Copy 1112 for a simple copy operation and Simple Scan 1114 for a simple scan operation. Typically, users can be directed to install customized user interfaces and pre-defined applications separately. Elevate eApp 1104 is suitably accessed through a web interface such as via TopAccess 1118. The Simple Copy 1112 and Simple Scan 1114 eApps are suitably assembled from selection of a stored or downloaded eApp, such as eApps 1122 and 1124. The Elevate eApp 1104 can be configured to execute as a background app for managing the user interface customization and pre-defined applications, including deployment, installation, upgrading, backup, and restoring. The Elevate eApp 1104 can pass configuration information to pre-defined apps such as Simple Copy 1112 and Simple Scan 1114 as illustrated, which are presented on a custom user interface 1108 on the front panel display of the MFP.

Figure 12:
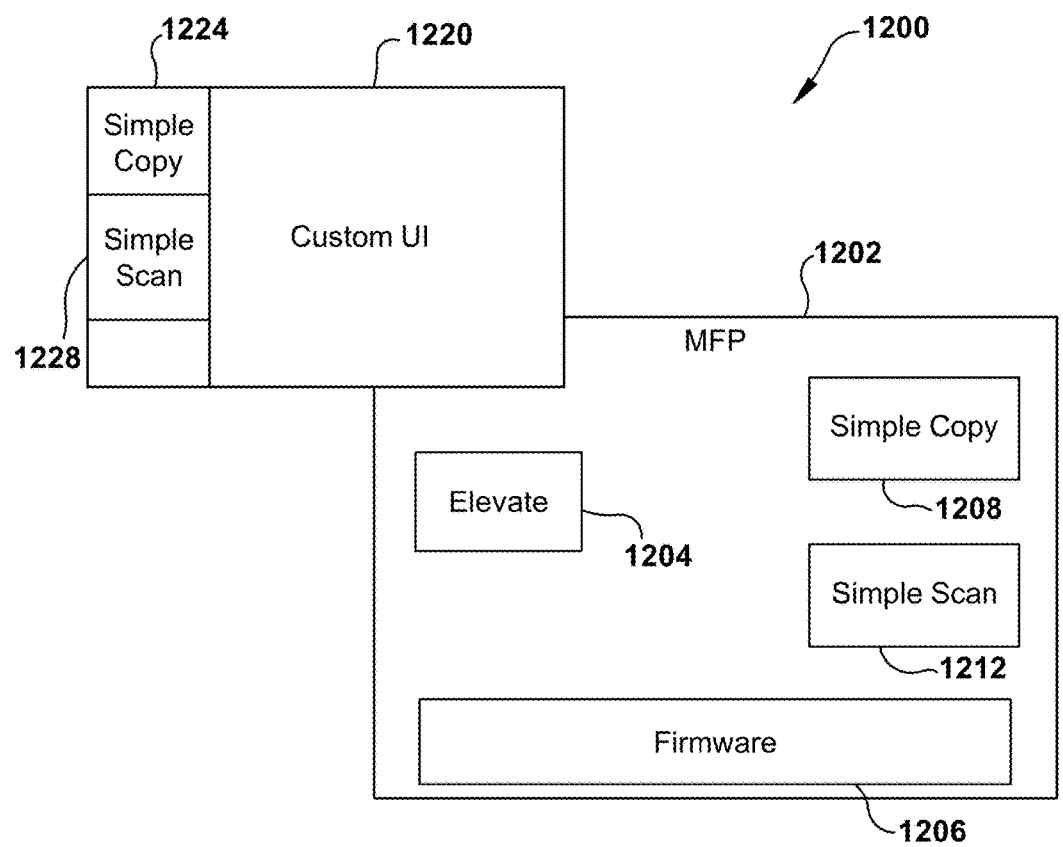
FIG. 12 is a system software diagram of an embodiment of a multifunction peripheral.

FIG. 12 illustrates am example embodiment of a system software diagram 1200 for MFP 1202. The system includes Elevate eApp 1204, pre-defined eApps, and firmware 1206 for presenting the custom user interface on the front panel display of the MFP. Example eApps comprise Simple Copy eApp 1208 and a Simple Scan eApp 1212. Once constructed, a custom user interface 1220 is generated and includes a selectable Simple Scan eApp 1224 for a simple copy operation and a selectable Simple Scan eApp 1228 for a simple scan operation. The Elevate eApp 1204 can perform various operations. For example, the Elevate eApp 1204 can back up a customized user interface 1220. The Elevate eApp 1204 can restore the backup of the custom user interface 1220. The Elevate eApp 1204 can install a custom user interface 1220 on the MFP 1202 based on the firmware version of the firmware. The Elevate eApp 1204 can install and register one or more pre-defined apps to enable them to function on the MFP 1202. If the Elevate eApp 1204 is uninstalled, and Elevate eApp 1204 can restore the front panel user interface, for example to a default or stored backup, and then uninstall and deregister all of the pre-defined apps. In a configuration, a firmware upgrade can wipe the backup, and the Elevate eApp 1204 then installs a custom user interface 1220 based on the upgraded firmware version, and installs and registers pre-defined apps.

Figure 13:
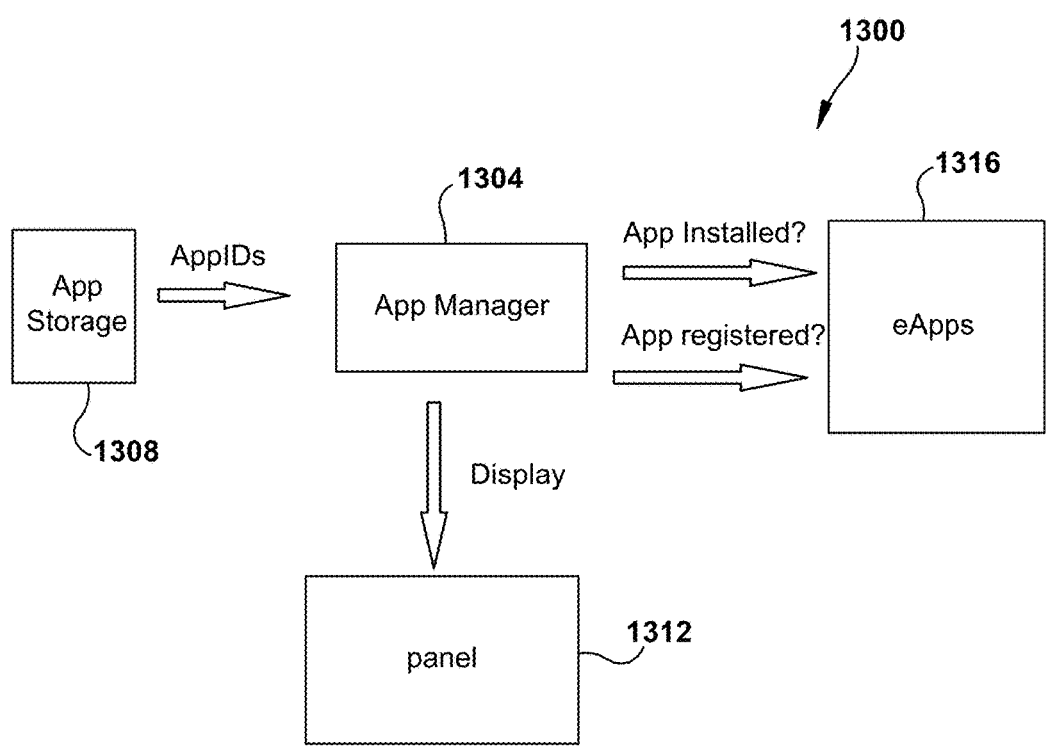
FIG. 13 is a diagram of operations of an embodiment of a user interface of a multifunction peripheral.

With reference to FIG. 13, an example diagram 1300 of installation, registration, and display of pre-defined apps on an MFP user interface. Generally, users can be directed to register applications with an MFP app store before the applications are displayed by user interface on an MFP's front display panel 1312. In the illustration of FIG. 13, app manager 1304 retrieves eApps and associated IDs from application storage 1308. eApps are displayed on display panel 1312. A set of user interface eApps 1316 communicates with app manager 1304 for data exchange relative to eApp installation and registration.

Users can install multiple applications on an MFP, for example using an MFP Web user interface or using the front panel user interface of the MFP. The user then manually registers each pre-defined eApp with the MFP app store, often using a different interface or screen. However, it is easy for a user to forget to register a pre-defined eApp or lose track of one or more installed pre-defined apps, especially if the user manually installs multiple apps at the same time, in which case other users will not be able to use unregistered apps on the MFP.

Figure 14:
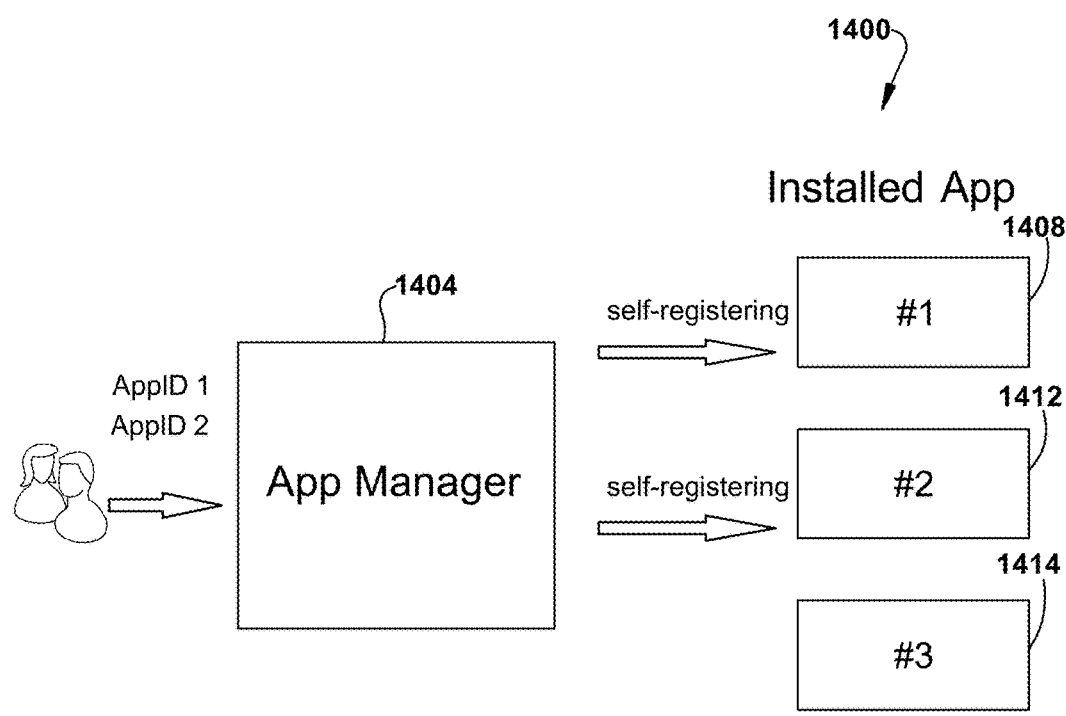
FIG. 14 is a diagram of automated registration of pre-defined apps in an embodiment of a multifunction peripheral.

Referring now also to FIG. 14, illustrated is an example diagram 1400 of automated registration of pre-defined apps on an MFP. To simplify the process for the user, an app manager 1404, for example a routine executing as part of the Elevate eApp described above, registers each installed, pre-defined eApps 1408, 1412 and 1414. The user enters an application identifier of a pre-defined eApp that the user wants to be displayed on the front panel of the MFP. The app manager performs the necessary operations in the background, without requiring the user to first check whether the pre-defined eApp has already been installed or manually register the pre-defined eApp with the MFP app store.

Figure 15:
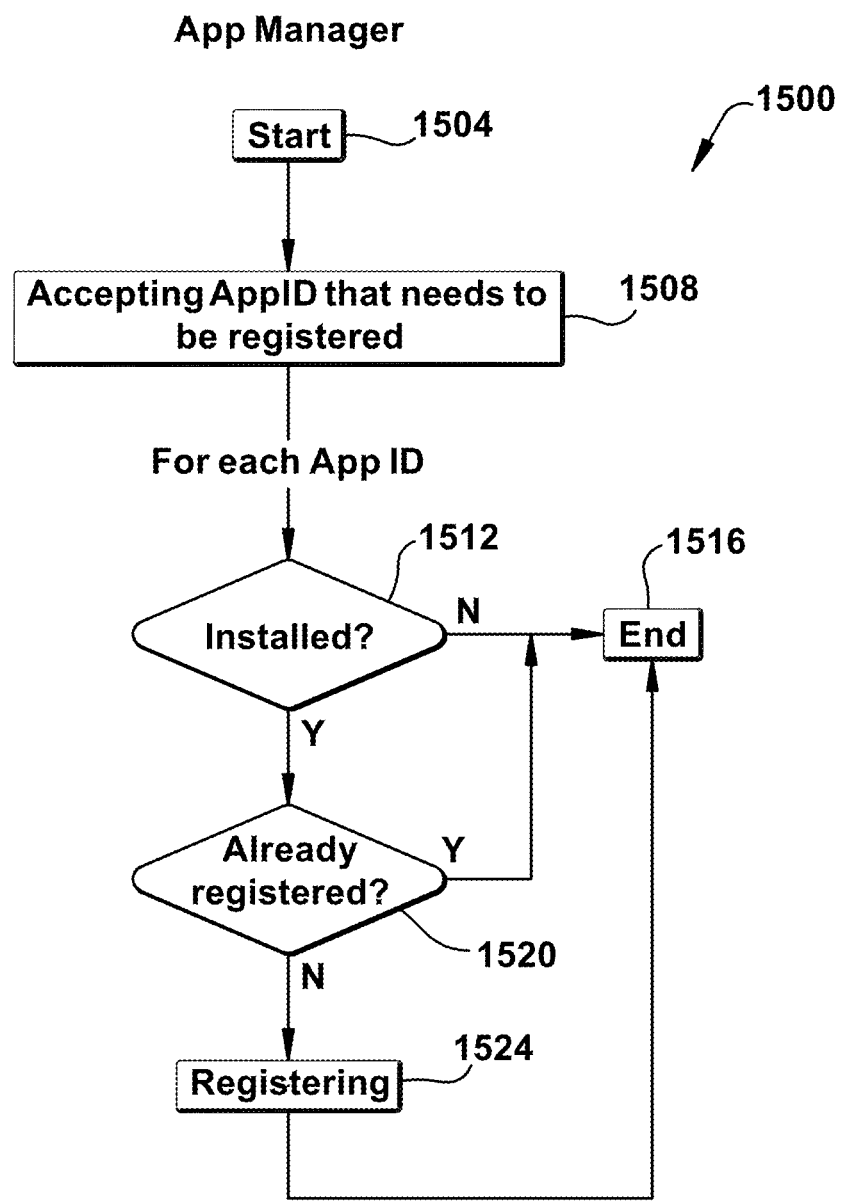
FIG. 15 is a flowchart of example operations for registering pre-defined apps in an embodiment of a multifunction peripheral.

FIG. 15 is an example flowchart 1500 for registering pre-defined eApps on an MFP. The user enters the application identifiers, such as App Names or App IDs or any other suitable application identifier. For each pre-defined eApp identified by the user, the app manager verifies that the pre-defined eApp is already installed, and then checks to see if the pre-defined eApp has already been registered. If the pre-defined apps has not been registered, then the app manager registers the pre-defined eApp with the MFP app store. These operations reduce the amount of overhead, in terms of manpower and time that is necessary to install pre-defined apps onto MFPs. In the illustrated example, the process commences at block 1504 and App IDs for eApps that need to be registered are identified and accepted at block 1508. If an eApp is determined not to be installed at block 1512, the process suitably terminates at block 1516. If an eApp is installed, a determination is made at block 1520 if it is already registered. If so, the process suitably terminates at block 1516. If an eApp is not registered, registration is done at block 1524 and the process terminates at block 1516.

With reference to FIG. 16, a first screenshot 1600 of an example application for managing and configuring customized user interfaces on the front display panel of a multi-function peripheral is presented. The application allows an administrator to install and uninstall pre-defined apps to be used in a customized user interface for an MFP. For example, hospitals regularly have a need to scan insurance cards or identification cards of patients at check-in. A customized user interface for an MFP at a hospital can include a selectable button for configuring the MFP to scan a reduce-size area of the scanner where a card would be placed at a desired resolution suitable for capturing information in small print on the card.

Figure 17:
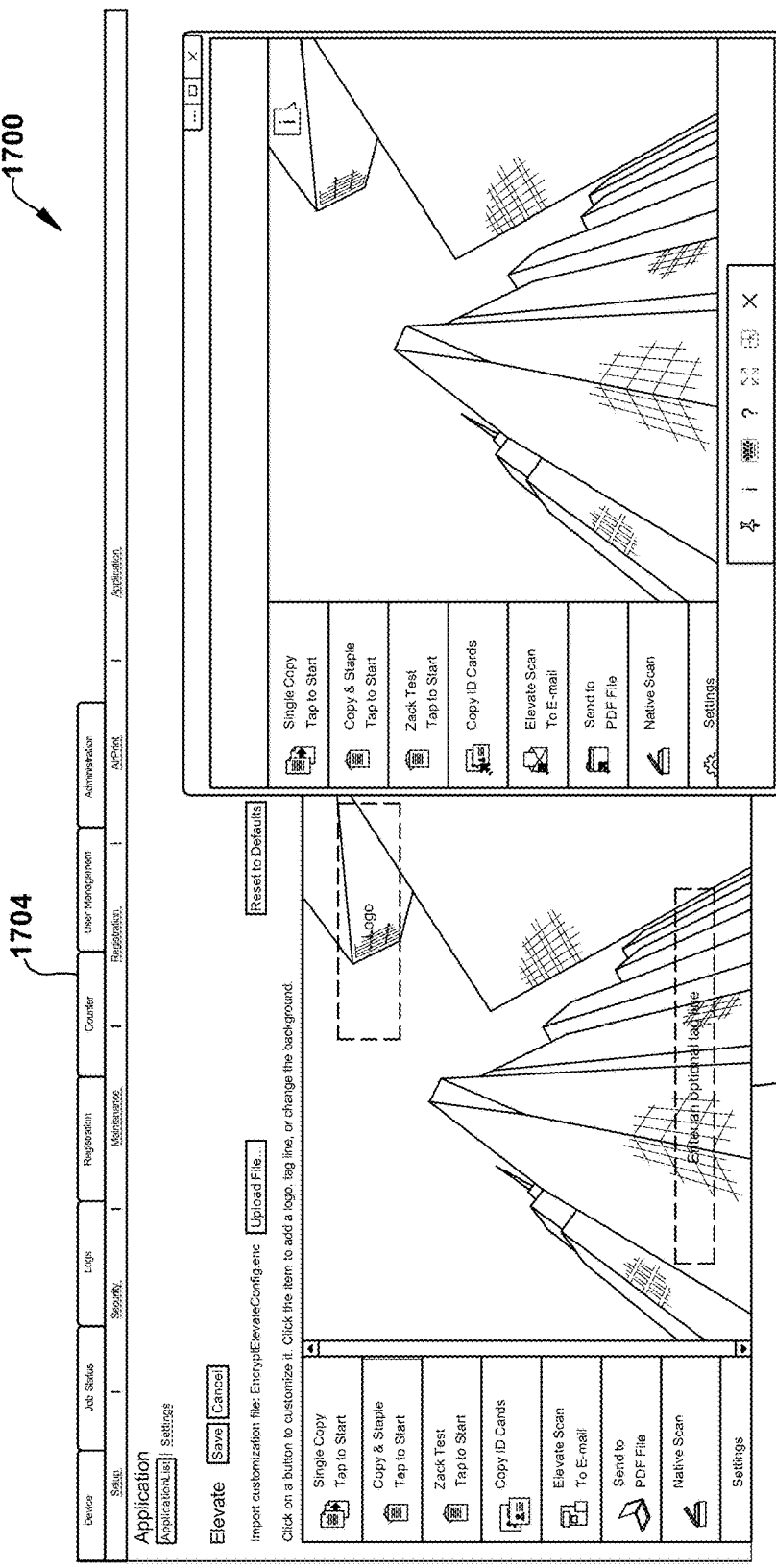
FIG. 17 is a second screenshot of an example application for managing customized user interfaces of a multifunction peripheral.

FIG. 17 illustrates a second screenshot 1700 of an example application showing a screenshot 1702 of web based user interface customization tool 1704, such as with customization done via TopAccess. The resulting customized interface display 1708 is what appears on an MFP touchscreen.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
    a scanner engine operable for scanning of tangible documents;
    a print engine operable for printing of electronic documents;
    a document processing device controller including a processor configured to control device operations of the multifunction peripheral including operation of the scanner engine and the print engine;
    a network interface; and
    a memory configured to
        store a plurality of user selectable applications for the controller associated with user modification of control of device operations via the controller,
        store a plurality of identified electronic customization groups, each customization group including a plurality of electronic files, and wherein each customization group corresponds to a unique business type, and
        store a plurality of device customization data sets, each data set corresponding to document processing in the multifunction peripheral,
    wherein the processor is configured to generate indicia on a display identifying each of the plurality of customization groups by business type, and
    wherein the processor is further configured to receive user selection data received via a user input corresponding to a selected identified customization group selected from the indicia,
    wherein the processor is further configured to identify at least a selected one of the user selectable application associated with received user selection data,
    wherein the processor is further configured to generate, on the display, a customizations menu listing available customizations from the selected identified customization group,
    wherein the processor is further configured to receive user application selection input responsive to user selection corresponding to a generated customization menu,
    wherein the processor is further configured to determine whether each application associated with the user application selection input is registered, and
    wherein the processor is further configured to register each unregistered application associated the user application selection input.

2. The multifunction peripheral of claim 1 wherein the processor is further configured to determine whether an application is registered in accordance with an associated application identifier.

3. The multifunction peripheral of claim 2 wherein the processor is further configured to abort determination as to whether an application is registered when the application is determined to not be installed.

4. The multifunction peripheral of claim 3 wherein the processor is further configured to abort registration of each application associated with the user application selection input that is determined to already be registered.

5. The multifunction peripheral of claim 4 wherein the processor is further configured as a webserver and wherein the display and user input is comprised of a networked web interface.

6. The multifunction peripheral of claim 5 wherein the network interface is further configured to establish a secure data channel with an associated administrative computer for communication of registration data.

7. The multifunction peripheral of claim 1 wherein the processor is further configured to install a customized user interface as an active multifunction user interface when each application associated with user application selection input has been registered.

8. A method comprising:
    storing a plurality of user selectable applications associated with user modification of control of device operations of a multifunction peripheral controller that includes a processor and associated memory;
    storing a plurality of identified electronic customization groups, each customization group including a plurality of electronic files, and wherein each customization group corresponds to a unique business type;
    storing a plurality of device customization data sets, each data set corresponding to document processing in the multifunction peripheral;
    generating indicia on a display identifying each of the plurality of customization groups by business type;
    receiving user selection data received via a user input corresponding to a selected identified customization group selected from the indicia;
    identifying at least a selected one of the user selectable applications associated with received user selection data;
    generating, on the display, a customizations menu listing available customizations from the selected identified customization group;
    receiving user application selection input responsive to user selection corresponding to a generated customization menu;
    determining whether each application associated with the user application selection input is registered; and
    registering each unregistered application associated the user application selection input.

9. The method of claim 8 further comprising determining whether an application is registered in accordance with an associated application identifier.

10. The method of claim 9 further comprising aborting determination as to whether an application is registered when the application is determined to not be installed.

11. The method of claim 10 further comprising aborting registration of each application associated with the user application selection input that is determined to already be registered.

12. The method of claim 11 further comprising generating the display and user input on a networked data device.

13. The method of claim 12 wherein the network interface is further configured to establish a secure data channel with an associated administrative computer for communication of registration data.

14. The method of claim 8 wherein the processor is further configured to install a customized user interface as an active multifunction user interface when each application associated with user application selection input has been registered.

15. A system comprising:
a processor;
a network interface; and
a memory configured to
store a plurality of user selectable applications associated with user modification of control of device operations on a multifunction peripheral via an associated device controller,
store a plurality of identified electronic customization groups, each customization group including a plurality of electronic files, and wherein each customization group corresponds to a unique business type, and
store a plurality of device customization data sets, each data set corresponding to document processing in the multifunction peripheral,
wherein the processor is configured to generate indicia on a display identifying each of the plurality of customization groups by business type, and
wherein the processor is configured to receive user selection data received via the user input corresponding to a selected identified customization group selected from the indicia,
wherein the processor is configured to identify at least a selected one of the user selectable applications associated with received user selection data,
wherein the processor is further configured to generate, on the display, a customizations menu listing available customizations from the selected identified customization group,
wherein the processor is further configured to receive user application selection input responsive to user selection corresponding to a generated customization menu,
wherein the processor is further configured to determine whether each application associated with the user application selection input is registered, and
wherein the processor is further configured to register each unregistered application associated with the user application selection input.

16. The system of claim 15 wherein the processor is further configured to determine whether an application is registered in accordance with an associated application identifier.

17. The system of claim 16 wherein the processor is further configured to abort registration of each application associated with the user application selection input that is determined to already be registered.

18. The system of claim 17 wherein the processor and associated memory comprise a networked workstation.

19. The system of claim 15 further wherein the processor is further configured to obtain at least one user selected application from an associated, networked data server.

20. The system of claim 19 wherein the networked data server is associated with an application store.

* * * * *